United States Patent [19]

Lassota

[11] 4,137,022

[45] Jan. 30, 1979

[54] ROTARY COMPRESSOR AND PROCESS OF COMPRESSING COMPRESSIBLE FLUIDS

[76] Inventor: Marek J. Lassota, 8657 W. Foster Ave., Apt. 1B, Chicago, Ill. 60656

[21] Appl. No.: 823,656

[22] Filed: Aug. 11, 1977

Related U.S. Application Data

[63] Continuation-in-part of Ser. No. 692,129, Jun. 2, 1976, abandoned, which is a continuation-in-part of Ser. No. 659,324, Feb. 19, 1976, abandoned, which is a continuation-in-part of Ser. No. 610,159, Sep. 4, 1975, Pat. No. 4,010,675, which is a continuation of Ser. No. 523,958, Nov. 14, 1974, abandoned.

[51] Int. Cl.² .................. F01C 1/24; F01C 21/08; F04C 17/16; F16J 1/24
[52] U.S. Cl. ........................... 418/1; 418/60; 418/83; 418/97; 418/142; 418/151; 92/177
[58] Field of Search .......... 418/1, 15, 54, 58–60, 418/151, 160, 83, 142, 97; 417/460, 462–466; 123/42, 51 B; 91/196; 92/177

[56] References Cited

U.S. PATENT DOCUMENTS

| 632,010 | 8/1899 | Gamble | 91/196 |
| 779,900 | 1/1905 | Bartlett | 418/160 |
| 1,622,816 | 3/1927 | Sperry | 418/58 |
| 1,718,070 | 6/1929 | Peters | 92/177 |
| 1,864,699 | 6/1932 | Varley | 418/54 |
| 3,090,366 | 5/1963 | Nagelmann | 123/42 |
| 3,315,653 | 4/1967 | Chicurel | 123/51 B |
| 3,835,823 | 9/1974 | Miller | 123/42 |

Primary Examiner—John J. Vrablik

[57] ABSTRACT

A rotary compressor and process of compressing compressible fluids wherein the compressor comprises a housing having at least two axially spaced walls and rotatable in relation to the housing piston and cylinder-piston elements journaled on eccentric portions of two oppositely rotatable shafts. The piston and cylinder-piston form moveable walls, and axially spaced walls of the housing form stationary walls of at least two compression chambers. Circulated fluid is drawn into the compression chambers through intake valves and is discharged through discharge valves.

31 Claims, 15 Drawing Figures

ROTARY COMPRESSOR AND PROCESS OF COMPRESSING COMPRESSIBLE FLUIDS

CROSS REFERENCE TO RELATED APPLICATIONS

This application is a continuation-in-part of my pending prior application Ser. No. 692,129, filed on June 2, 1976, now abandoned, which is a continuation-in-part of my prior application Ser. No. 659,324, filed on Feb. 19, 1976, now abandoned, which is a continuation-in-part of my earlier application Ser. No. 610,159, filed on Sept. 4, 1975, now U.S. Pat. No. 4,010,675, which is a continuation of prior application Ser. No. 523,958, filed Nov. 14, 1974, now abandoned.

BACKGROUND OF THE INVENTION

This invention relates in general to a compressor and process of compressing, and more particularly to a rotary compressor and process of compressing compressible fluids.

Reciprocating piston compressors are well known in the art. They possess, however, inherent disadvantages of having reciprocating motion of a piston causing high stresses in certain components, vibration, noise, and limiting their rotational speeds. Due to speed limitations reciprocating compressors are also relatively bulky and heavy machines.

Various types of rotary compressors have been proposed to replace the reciprocating piston compressor in order to overcome some of its disadvantages, and to realize new advantages. However, such efforts have not been fully successful and the reciprocating piston compressor is in widespread use today.

SUMMARY OF THE INVENTION

The rotary compressor of this invention comprises generally an outer housing within which rotatable piston and cylinder-piston elements are received. The housing comprises at least two axially spaced walls, and the piston and cylinder-piston are operatively positioned between and adjacent to them. The piston and cylinder-piston are journaled on eccentric portions of two shafts, while the eccentric portions are disposed between the axially spaced walls of the housing. The shafts are journaled in axially spaced walls and are interconnected by a gearing means to transmit power from a drive shaft to a driven shaft and to coordinate their movements in such a way so the shafts rotate in coordinated rotations in opposite directions and with equal speeds. Each piston and cylinder-piston follow coordinated planetary movements in opposite directions with and about the eccentric portions of their shafts and form moveable walls of two compression chambers, whereas the stationary walls of the compression chamber are formed by the axially spaced walls of the housing. Any desired number of piston and cylinder-piston assemblies can be mounted on suitable shafts and between suitable stationary walls to form a rotary compressor with 2, 4, 6 or more compression chambers.

Intake charge of fluid circulated through the compressor of this invention is drawn into the compression chambers through suitable intake valves, and is discharged from the compression chambers through suitable discharge valves.

Internal leakage between the piston and cylinder-piston, and between the piston and cylinder-piston and adjacent spaced walls may be controlled through use of a sealing system comprising sealing elements received within grooves of the piston and cylinder-piston and sealingly engaged with co-working surfaces of the cylinder-piston and spaced walls, or may be controlled through hydrodynamic sealing between co-working elements without use of any sealing elements, but as a result of suitable running clearances between co-working elements, suitable surface finish and use of lubricant of suitable viscosity as a sealing medium. The same lubricant may be used to lubricate bearings and gear transmission.

OBJECTS OF THE INVENTION

One object of the present invention is to provide a multi-compression chambers rotary compressor simple in construction, compact and lightweight.

Another object of the present invention is to provide a rotary compressor capable of well balanced operation over wide range of RPM.

Yet another object of the present invention is to provide a rotary compressor having intake system with intake valves and discharge system with discharge valves.

Still another object of the present invention is to provide a rotary compressor capable of long and trouble-free service life.

Another object of the present invention is to provide a new process of compressing compressible fluids by the rotary compressor of this invention.

These and other objects of the present invention will become apparent when reading the annexed detailed description in the view of the drawings.

BRIEF DESCRIPTION OF THE DRAWINGS

FIG. 12 shows the beginning of the intake stroke in first compression chamber, which is at about its minimum volume, and the end of the intake stroke in second compression chamber, which is at about its maximum volume.

FIG. 13 shows the intake and compression strokes at the middle in both compression chambers;

FIG. 14 shows the end of the intake stroke in the first compression chamber, which is at about its maximum volume, and the end of the compression stroke in the second compression chamber, which is at about its minimum volume; and FIG. 15 shows the middle of the compression stroke in the first compression chamber and intake stroke in second compression chamber.

DETAILED DESCRIPTION OF THE INVENTION

Figure 1:
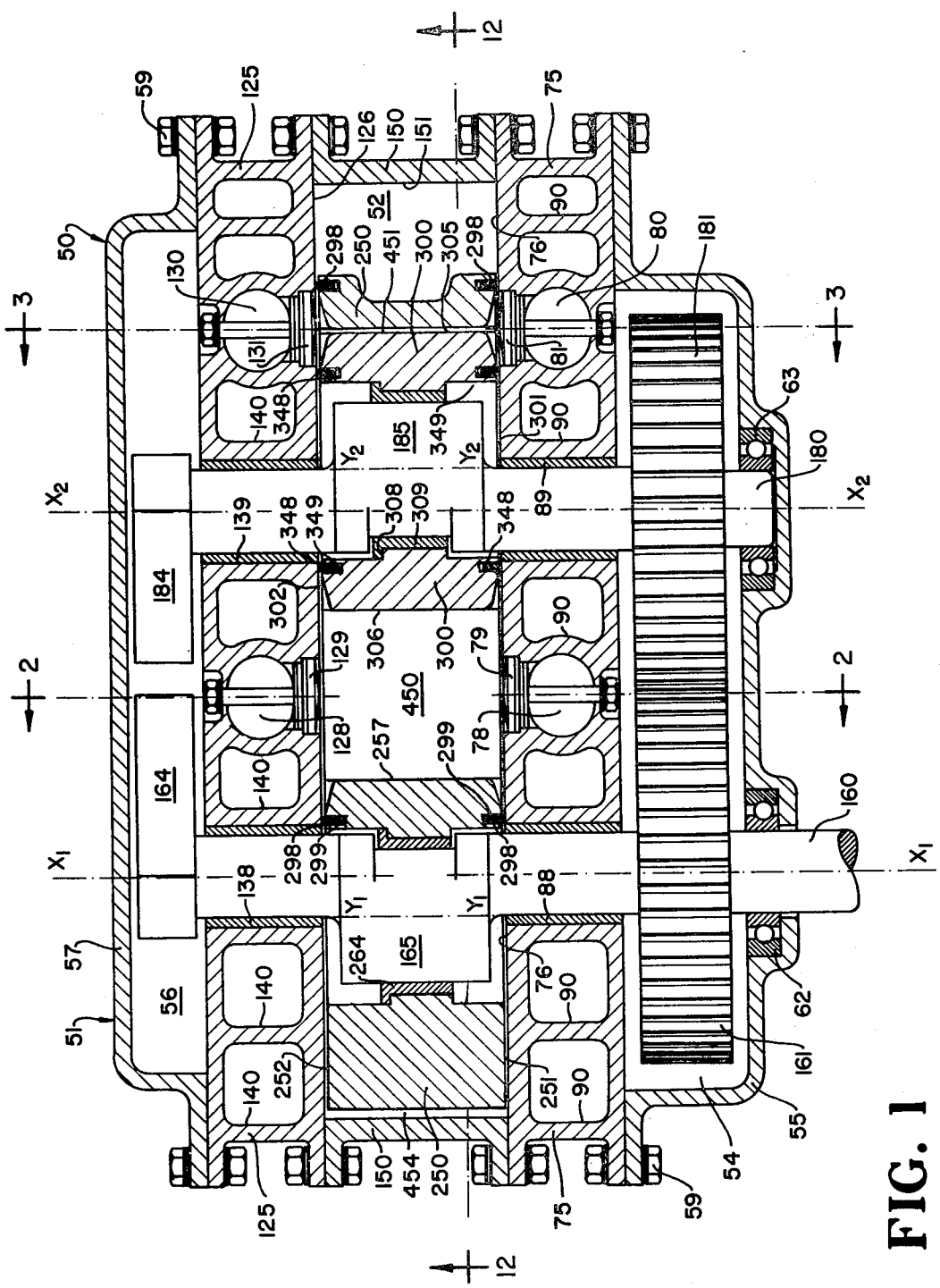
FIG. 1 is a longitudinal sectional view through a rotary, two compression chambers compressor embodying this invention, taken along the lines 1—1 in FIGS. 2 and 3.
Figure 2:
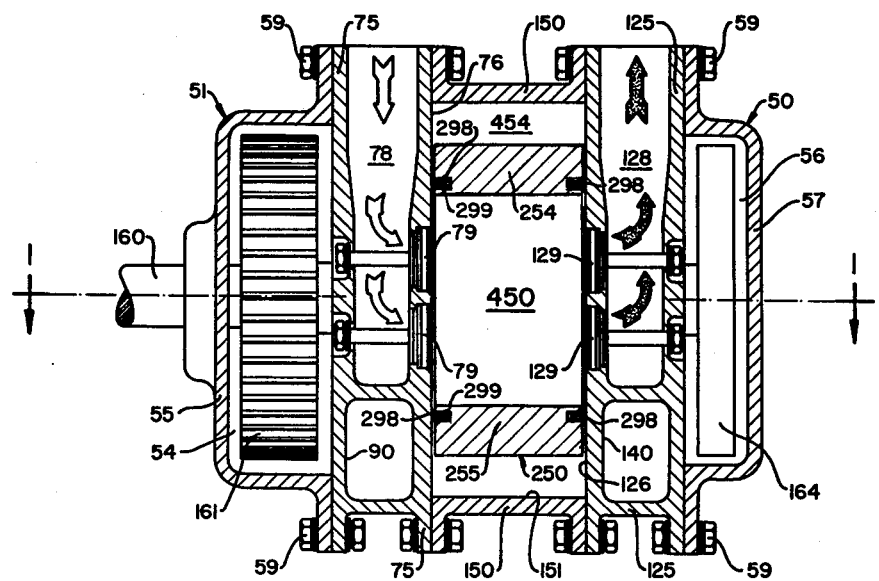
FIG. 2 is a vertical sectional view taken along the line 2—2 of FIG. 1, showing the first variable volume compression chamber with the intake and discharge systems.
Figure 3:
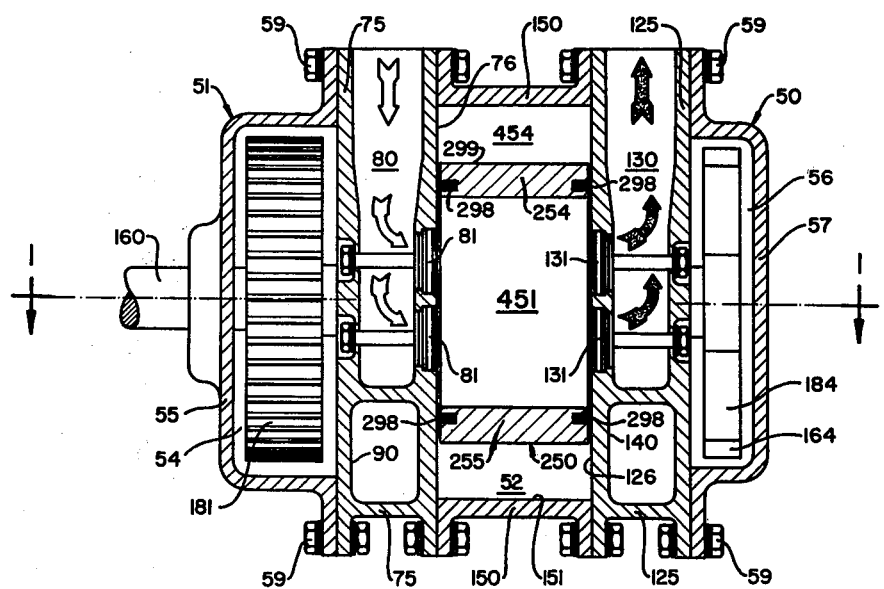
FIG. 3 is a vertical sectional view taken along the line 3—3 of FIG. 1, showing the second variable volume compression chamber with the intake and discharge systems.

Referring first to FIGS. 1, 2 and 3 of the drawings, a rotary compressor according to the invention and having two compression chambers is indicated by numeral 50. Compressor 50 comprises housing 51 within which piston 300 and cylinder-piston 250 forming moveable walls of compression chambers 450 and 451 are journaled on eccentric portions 165 and 185 of rotatable in opposite directions shafts 160 and 180.

Housing 51 comprises axially spaced walls 75 and 125 having surfaces 76 and 126 interconnected by peripheral wall 150 with inside surface 151 to form cavity 52. Spaced walls 75 and 125 form stationary walls of compression chambers 450 and 451 and portions of surfaces 76 and 126 of spaced walls 75 and 125 define stationary surfaces of compression chambers 450 and 451, while other portions of surfaces 76 and 126 and surface 151 of peripheral wall 150 define stationary surfaces of chamber 454 located around cylinder-piston 250 and piston 300 and within cavity 52. Gear transmission cover 55 forms with spaced wall 75 gear cavity 54, and counterbalance cover 57 forms with spaced wall 125 counterbalance cavity 56. Elements 55, 75, 150, 125 and 57 are fastened by suitable fastening means, as for example bolts 59.

In the embodiment illustrated spaced walls 75 and 125 are spaced axially along axes $X_1$—$X_1$ and $X_2$—$X_2$ of shafts 160 and 180 by peripheral wall 150 positioned between and secured to spaced walls 75 and 125. However, any suitable spacing means, different from those described, can be used to axially space walls 75 and 125 as required for operation of cylinder-piston 250 and piston 300.

Internal structures of spaced walls 75 and 125 are best shown in FIGS. 1, 2 and 3. Wall 75 has intake channels 78 and 80 communicating with compression chambers 450 and 451 through suitable intake valves 79 and 81. Wall 125 has discharge channels 128 and 130 connected with compression chambers 450 and 451 by suitable discharge valves 129 and 131.

In the embodiment illustrated, the intake system is shown in wall 75, and the discharge system is shown in spaced wall 125. However, any suitable combination of the intake and discharge systems in one or both spaced walls can be used.

The intake or discharge valves may be any suitable intake or discharge valves, preferably compressor-type intake or discharge valves, and will not be described here in more detail because their design and operation is well known to those skilled in the art.

Spaced walls 75 and 125 may have cooling chambers or passageways 90 and 140 to circulate suitable coolant. If air is used as a cooling medium, chambers or passageways 90 and 140 may have cooling ribs on their internal surfaces.

Figure 5:
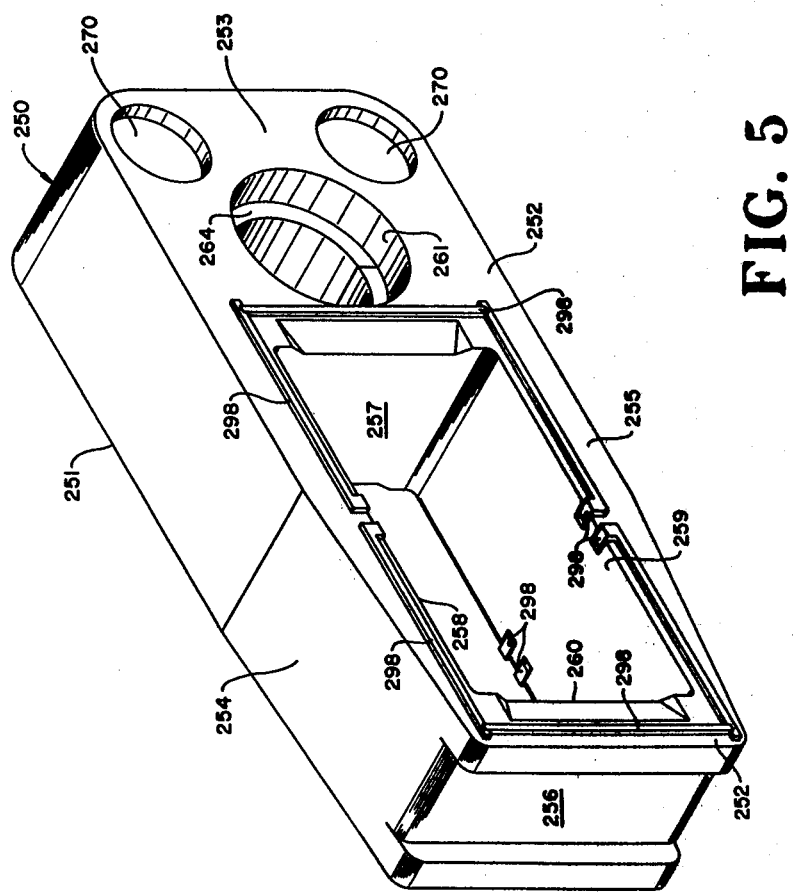
FIG. 5 is a perspective view of the cylinder-piston element with elements sealing the compression chambers and bearing assembled.
Figure 7:
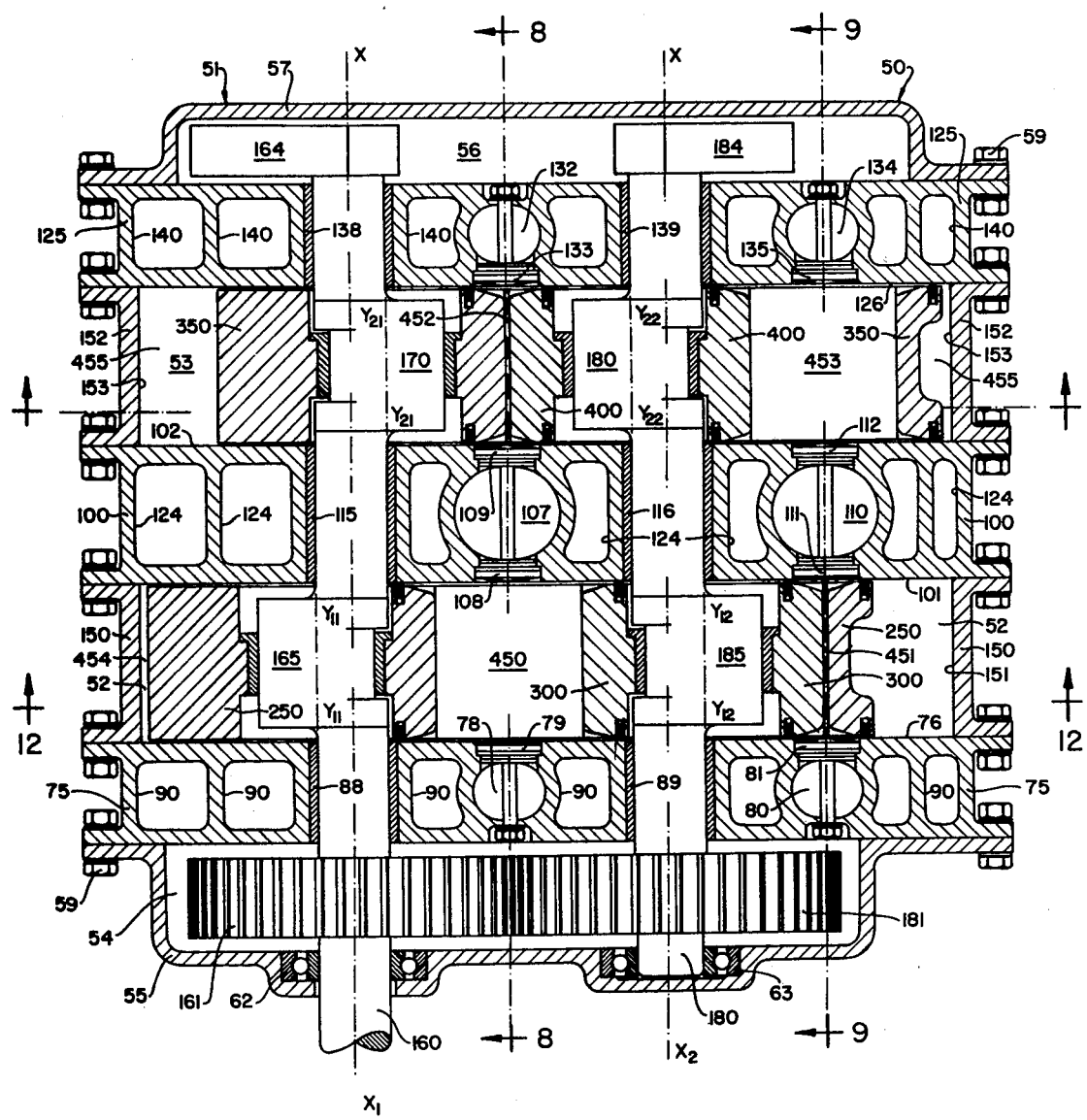
FIG. 7 is a longitudinal sectional view through a rotary, four compression chambers compressor embodying this invention, taken along the lines 7—7 in FIGS. 8 and 9.
Figure 8:
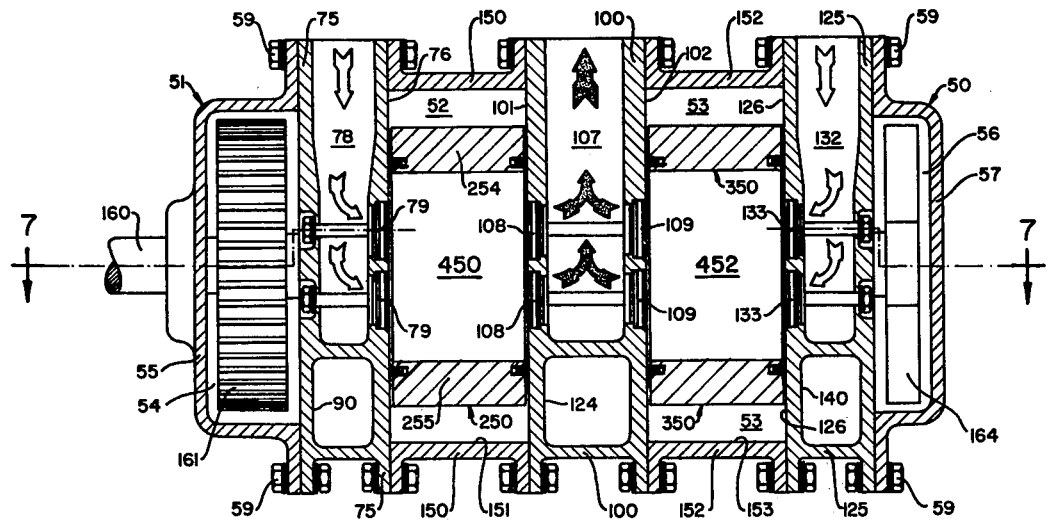
FIG. 8 is a vertical sectional view taken along the line 8—8 of FIG. 7 and showing two of the four variable volume compression chambers of the compressor with their intake and discharge systems.
Figure 9:
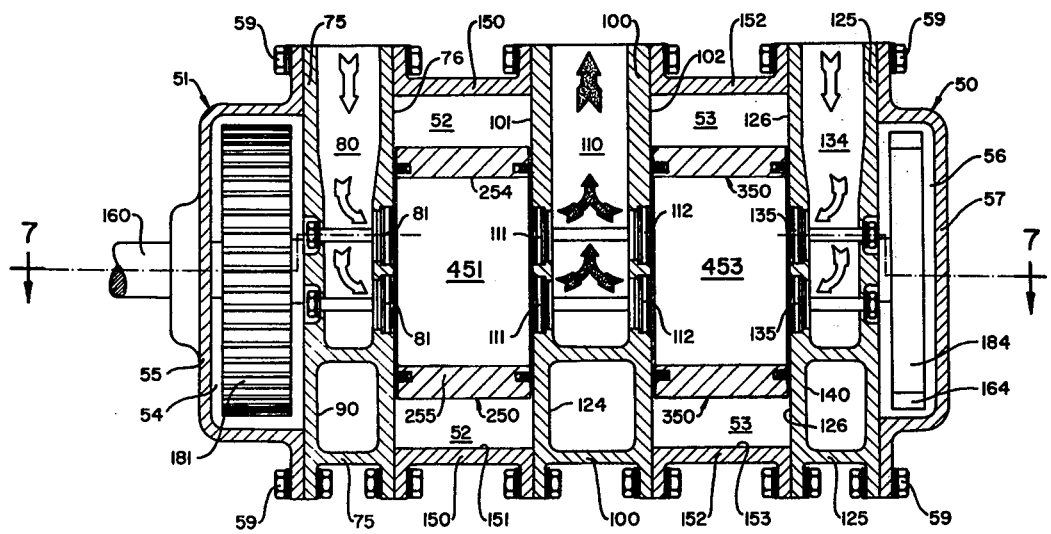
FIG. 9 is a vertical sectional view taken along the line 9—9 of FIG. 7, showing the next two of four compression chambers with intake and discharge systems.

Cylinder-piston 250 with its elements sealing compression chambers 450 and 451 and bearing 264 assembled is best shown in view of FIG. 5. The term "cylinder-piston" refers to an element operating as both a cylinder and a piston, although the configuration of this element is not at all geometrically cylindrical.

Cylinder-piston 250 comprises body 253 and spaced walls 254 and 255 extending from one end of body 253 and connected at their ends remote from body 253 by connecting wall 256. Spaced walls 254 and 255 have opposing parallel surfaces 258 and 259; body 253 has surface 257, and connecting wall 256 has surface 260 opposing surface 257 of body 253. Surfaces 257, 258 and 259 and 260 define an opening in cylinder-piston 250 in which piston 300 operates adjacent to surfaces 258 and 259 and between surfaces 257 and 260. Surfaces 258, 259 and 257 form three of four moveable surfaces of compression chamber 450, and surfaces 258, 259 and 260 form three of four moveable surfaces of compression chamber 451.

Bearing 264 is located in housing 261 of body 253. At the end of cylinder-piston body 253 remote from spaced arms 254 and 255 balancing elements 270 may be received in suitable openings. The purpose of balancing elements 270 is to balance the masses of spaced arms 254 and 255 and connecting wall 256 to make a center of gravity of cylinder-piston 250 located on or close to axis $Y_1$—$Y_1$, common for bearing 264 and eccentric portion 165 of shaft 160. However, balancing of cylinder-piston 250 can be realized without use of balancing elements 270, and sufficiently large portion of body 253 remote from spaced arms 254 and 255 can act as a balancing element to balance cylinder-piston 250.

Figure 6:
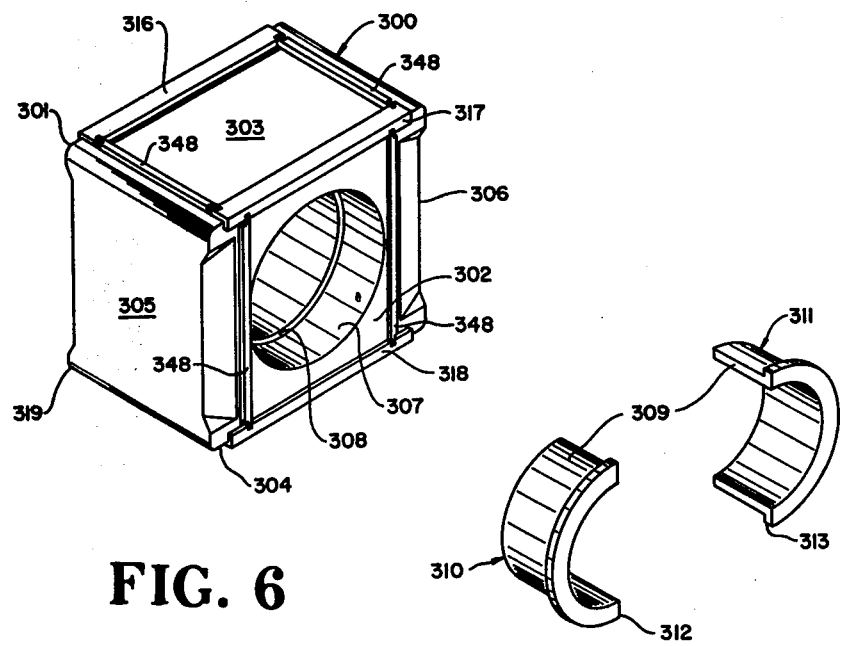
FIG. 6 is a perspective view of the piston element with elements sealing the compression chambers assembled and with two halves of its bearing exploded.

FIG. 6 shows piston 300 with its sealing elements assembled and bearing 309 exploded. Piston 300 has spaced side faces 301 and 302 interconnected by passageway 307 in which bearing 309 is located. Piston 300 has also pair of spaced faces 303 and 304 and pair of end faces 305 and 306. End face 306 connects spaced side faces 301 and 302 and spaced faces 303 and 304 and form fourth moveable surface of compression chamber 450, changing the volume of compression chamber 450 during the operation of the compressor. Likewise, end face 305 connects spaced side faces 301 and 302 and spaced faces 303 and 309 and form fourth moveable surface of compression chamber 451, changing the volume of compression chamber 451 during the operation of the compressor.

The width of piston 300, measured along axis $Y_2$—$Y_2$ of its bearing 309 is coextensive with the width of cylinder-piston 250, measured along axis $Y_1$—$Y_1$ of its bearing 264.

Due to its symmetrical shape piston 300 can be readily balanced to have its center of gravity located on or close to the axis $Y_2$—$Y_2$ which is common for bearing 309 and eccentric portion 185 of shaft 180.

Figure 4:
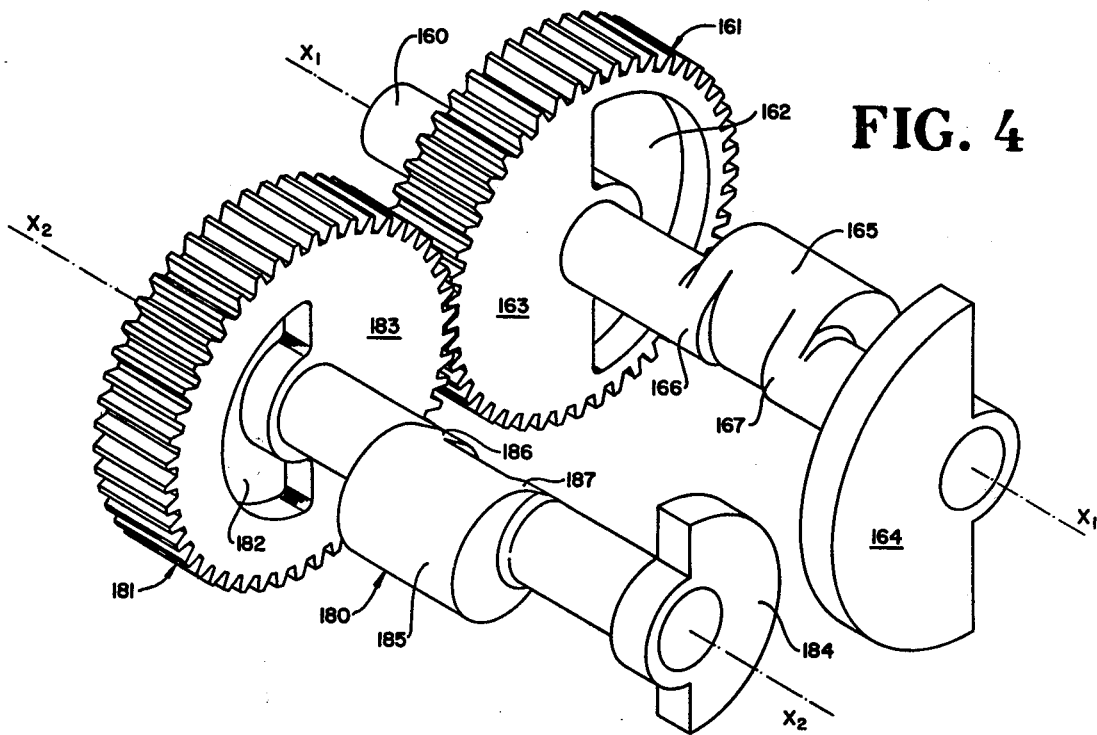
FIG. 4 is a perspective view of the two shafts of the two compression chambers compressor, with gears and balancing elements assembled.

FIG. 4 shows from the backside of the compressor shafts 160 and 180 assembled with their gears and balancing elements. Gears 161 and 181 and balancing elements 164 and 184 are secured to shafts 160 and 180 by means not shown. Gear 161 may have some material removed at 162; opposite portion 163 of gear 161 may be heavier and together with balancing element 164 may balance eccentric portion 165 and journaled thereon cylinder-piston 250. Similarly, gear 181 may have suitable amount of material removed at 182; opposite portion 183 of gear 181 may be heavier and may balance, with balancing element 184 eccentric portion 185 and piston 300 journaled thereon.

Different balancing systems than above described can be used to dynamically balance shafts 160 and 180 with recognized practice. For example, balancing system not utilizing gears but only balancing elements similar to balances 164 and 184 and suitably secured to shafts 160 and 180 can be used to balance one or both of shafts 160 and 180. Balanced shafts 160 and 180 have their centers of gravity located on or close to their axes of rotation $X_1$—$X_1$ and $X_2$—$X_2$, as required for balanced operation of a rotary compressor of this invention.

Eccentric portions 165 and 185 can be cranks when shafts 160 and 180 are crankshafts, or can be eccentrics when shafts 160 and 180 are eccentric shafts. Eccentric portions 165 and 185 have axes $Y_1$—$Y_1$ and $Y_2$—$Y_2$ eccentric from and parallel to axes $X_1$—$X_1$ and $X_2$—$X_2$ of shafts 160 and 180.

Assembled rotary compressor of the embodiment illustrated is best seen in FIGS. 1 through 3 and in FIGS. 12 through 15.

Cylinder-piston 250 is journaled on eccentric portion 165 of shaft 160; piston 300 is journaled on eccentric portion 185 of shaft 180 and is slidably positioned between spaced walls 254 and 255 of cylinder-piston 250, which is best visible in FIGS. 12 through 15.

Shafts 160 and 180 are journaled in suitable bearings 88, 89, 138 and 139 located in their housings in spaced walls 75 and 125. Bearings 88 and 138 journal shaft 160 and bearings 89 and 139 journal shaft 180. Shafts 160 and 180 are spaced for meshing of gears 161 and 181 and are rotating around axes $X_1$—$X_1$ and $X_2$—$X_2$. This is best seen in view of FIG. 1.

Shafts 160 and 180 may be additionally journaled in bearings 62 and 63 located in gear transmission cover 55.

However, any suitable journaling system for journaling of shafts 160 and 180 and different from the above described can be used. For example, shafts 160 and 180 can be journaled in bearings suitably located in gear transmission cover 55 and in counterbalance cover 57 without being journaled in spaced walls 75 and 125, or any other suitable combination of bearings in elements 55, 75, 125 and 57, or in elements similar to covers 55 and 57 and suitable for supporting required bearings can be used. Elements with bearings journaling shafts 160 and 180 should be aligned by suitable means, as for example suitable dowel pins.

Bearing 309 of piston 300 is best seen exploded in view of FIG. 6. For assembly around eccentric portion 185 and between arms 186 and 187 of shaft 180 (when shaft 180 is a crankshaft) and within pssageway 307 of piston 300, bearing 309 is split in two halves 310 and 311 comprising flanges 312 and 313. Flanges 312 and 313 may operatively position halves 310 and 311 against step 308 in passageway 307. Any other suitable means to position halves 310 and 311, different from described above, can be used instead of flanges 312 and 313. Halves 310 and 311 should be secured to piston 300 by suitable securing means, not shown.

Bearing 264 of cylinder-piston 250 can be indentical with bearing 309 of piston 300 and can be mounted in passageway 261 and around eccentric portion 165 of shaft 160 and between arms 166 and 167 in a similar manner.

When shafts 160 and 180 are eccentric shafts having eccentrics 165 and 185 then any suitable bearings, for example, one-piece bearings, can be used to journal cylinder-piston 250 and piston 300.

Separate shaft bearings 88, 89, 138 and 139 (and, if necessary, bearings 62 and 63) and cylinder-piston and piston bearings 264 and 309, as shown in the drawings, can be replaced by suitable bearings machined directly in spaced walls 75 and 125 and in cylinder-piston body 253 and piston 300 if elements 75, 125, 253 and 300 are made of material having suitable bearing properties. For example, one such material can be suitable grade of cast iron.

Shafts 160 and 180 are interconnected by gears 161 and 181 to transmit power from a drive shaft to a driven shaft and to coordinate their rotations and rotate in coordinated rotations in opposite directions with equal speeds. Cylinder-piston 250 and piston 300 follow coordinated planetary rotations in opposite directions with and about eccentric portions 165 and 185 of shafts 160 and 180. Spaced faces 303 and 304 of piston 300 are disposed adjacent to opposing parallel surfaces 158 and 259 of spaced walls 254 and 255. Side face 251 of cylinder-piston 250 and spaced side face 301 of piston 300 are adjacent to surface 76 of wall 75. Likewise, side face 252 of cylinder-piston 250 and spaced side face 302 of piston 300 are disposed adjacent to surface 126 of wall 125. Surfaces 257, 258 and 259 of cylinder-piston 250 and end face 306 of piston 300 form moveable surfaces of compression chamber 450. Movement of surface 306 of piston 300 with respect to surfaces 257, 258 and 259 of cylinder-piston 250 changes the volume of variable volume compression chamber 450. Likewise, surfaces 258, 259 and 260 of cylinder-piston 250 and end face 305 of piston 300 form moveable surfaces of second compression chamber 451, and movement of surface 305 with respect to surface 258, 259 and 260 changes the volume of compression chamber 451 during the operation of the compressor.

For efficient operation of the rotary compressor embodying this invention, its compression chambers should be sealed. One solution is to introduce suitable sealing elements between co-working surfaces defining compression chambers 450 and 451. Such sealing system can comprise cylinder-piston sealing elements 298 located with their springs 299 in suitable grooves in side faces 251 and 252 and along edges of surfaces 257, 258, 259 and 260 of cylinder-piston 250, and forming a part of compression chambers 450 and 451 sealing system. This is best shown in view of FIG. 5; springs 299 are shown in FIGS. 1, 2 and 3.

Another portion of compression chambers 450 and 451 sealing system is formed by sealing elements 348 located with their springs 349 in suitable grooves in piston 300 around edges of end faces 305 and 306 and in corners between spaced side faces 301 and 302 and spaced faces 303 and 304. This is best seen in FIG. 6; springs 349 are shown in FIGS. 1, 2 and 3.

When fully assembled, sealing elements 298 are forced from their grooves in side faces 251 and 252 of cylinder-piston 250 by springs 299 into sealing engagement with surfaces 76 and 126 of spaced walls 75 and 125, and piston 300 sealing elements 348 are forced by springs 299 from their grooves into sealing engagement with surfaces 258 and 259 of walls 254 and 255 of cylinder-piston 250 and with surfaces 76 and 126 of spaced walls 75 and 125 to form a closed sealing path around compression chambers 450 and 451.

Another solution to seal compression chambers 450 and 451 is to sealingly engage all moveable and stationary elements forming compression chambers without any sealing elements. Such sealing engagement between spaced faces 303 and 304 disposed adjacent to opposing parallel surfaces 258 and 259 of walls 254 and 255 of cylinder-piston 250; between side face 251 of cylinder-piston 250 and spaced side face 301 of piston 300 adjacent to surface 76 of wall 75, and between side face 252 of cylinder-piston 250 and spaced side face 302 of piston 300 adjacent to surface 126 of spaced wall 125 can result from a combination of suitable running clearances between these elements, suitable finish of their coacting surfaces, use of lubricant of suitable viscosity and suitable rotational speed of the compressor.

However, any suitable sealing system different from systems above described can be used to seal compression chambers 450 and 451 without departing from the spirit of this invention. Also, housing 51 can be made as a pressure tight vessel, and an interior of housing 51 can be pressurized to a certain pressure to minimize leakage from the compression chamber into cavity 52, regardless of the type of sealing system used to seal the compression chamber.

All coating surfaces 251, 252, 258 and 259 of cylinder-piston 250; 301, 302, 303 and 304 of piston 300, and surfaces 76 and 126 of spaced walls 75 and 125 must be sufficiently wear-resistant as required for desired operating characteristics and life of the compressor. This can be realized by use of suitable materials for aforementioned elements, and suitable hardness, finish and lubrication of their coacting surfaces.

Bearings of the rotary compressor of this invention can be lubricated by any suitable lubricant which can be delivered to the bearings by suitable delivery lines located in stationary elements or in rotating shafts. The lubricant can be the same as lubricating gears 161 and 181 and coacting surfaces of cylinder-piston 250 and piston 300 with their seals and surfaces 76 and 126 of walls 75 and 125. Lubricant from suitable reservoir (not shown) can be distributed to lubricate bearings and other coacting surfaces by any suitable splash, gravity or pum-feed lubricating system. This compressor can also be built as an unlubricated or so-called oil-less machine by using suitable self-lubricating materials for bearings and other coacting surfaces.

Lubricant used to lubricate internal coacting surfaces can also be used as a cooling medium to cool internal components of the compressor.

Referring now to FIGS. 7 through 11 of the drawings, a rotary compressor having four compression chambers is indicated by numeral 50. Compressor 50 comprises housing 51 having cavity 52 within which cylinder-piston 250 and piston 300 are received, and cavity 53 within which cylinder-piston 350 and piston 400 are received Cylinder-pistons 250 and 350 are journaled on eccentric portions 165 and 170 of shaft 160, and pistons 300 and 400 are journaled on eccentric portions 185 and 190 of shaft 180. Cylinder-pistons 250 and 350 and pistons 300 and 400, respectively, follow coordinated planetary movements in opposite directions and form moveable surfaces of four compression chambers. Cylinder-piston 250 and piston 300 form moveable surfaces of compression chamber 450 and 451, and cylinder-piston 350 and piston 400 form moveable surfaces of compression chambers 452 and 453.

It should be understood, however, that a combination of piston and cylinder-piston elements may be rotatably mounted on one shaft, and a suitable combination of cylinder-piston and piston elements may be mounted on the second shaft.

The four compression chambers compressor of FIGS. 7 through 11 has axially spaced wall 75 identical with wall 75 of the two compression chambers compressor as illustrated in FIGS. 1 through 6.

Also, gear transmission cover 55 forming gear transmission cavity 54 and counterbalance cover 57 forming counterbalance cavity 56 are identical in both compressor versions.

Axially spaced wall 125 has intake channels 132 and 134 connected with compression chambers 452 and 453 by suitable intake valves 133 and 135, respectively.

Four compression chambers compressor comprises further central axially spaced stationary wall 100 having surfaces 101 and 102. Surface 101 and surface 76 of wall 75 are interconnected and axially spaced by peripheral wall 150 having inside surface 151, to form cavity 52. Surfaces 101 and 76 are spaced as required for the operation of cylinder-piston 250 and piston 300 disposed adjacent to and between them and define the stationary surfaces of compression chambers 450 and 451.

Likewise, surface 102 of wall 100 and surface 126 of wall 125 are interconnected and axially spaced by peripheral wall 152 having inside surface 153, to form cavity 53. Surfaces 102 and 126 are spaced as required for the operation of cylinder-piston 350 and piston 400 disposed adjacent to and between them and define the stationary surfaces of compression chambers 452 and 453.

In the embodiment illustrated, spaced walls 75, 100 and 125 are interconnected and spaced by peripheral walls 150 and 152. However, any suitable spacing means, different from those described, can be used to axially space walls 75, 100 and 125 as required.

Discharge channels 107 and 110 are located in central, axially spaced wall 100. Between discharge channel 107 and compression chamber 450 are located one or more discharge valves 108. Between discharge channel 107 and compression chamber 452 are located one or more discharge valves 109. Between discharge channel 110 and compression chamber 451 are located one or more discharge valves 111; and between discharge channel 110 and compression chamber 453 are located one or more discharge valves 112.

In the specific embodiment illustrated, intake systems are located in walls 75 and 125, while discharge systems are located in central stationary wall 100. However, any suitable combination of the intake and discharge systems may be used in stationary walls 75, 100 and 125.

Figure 11:
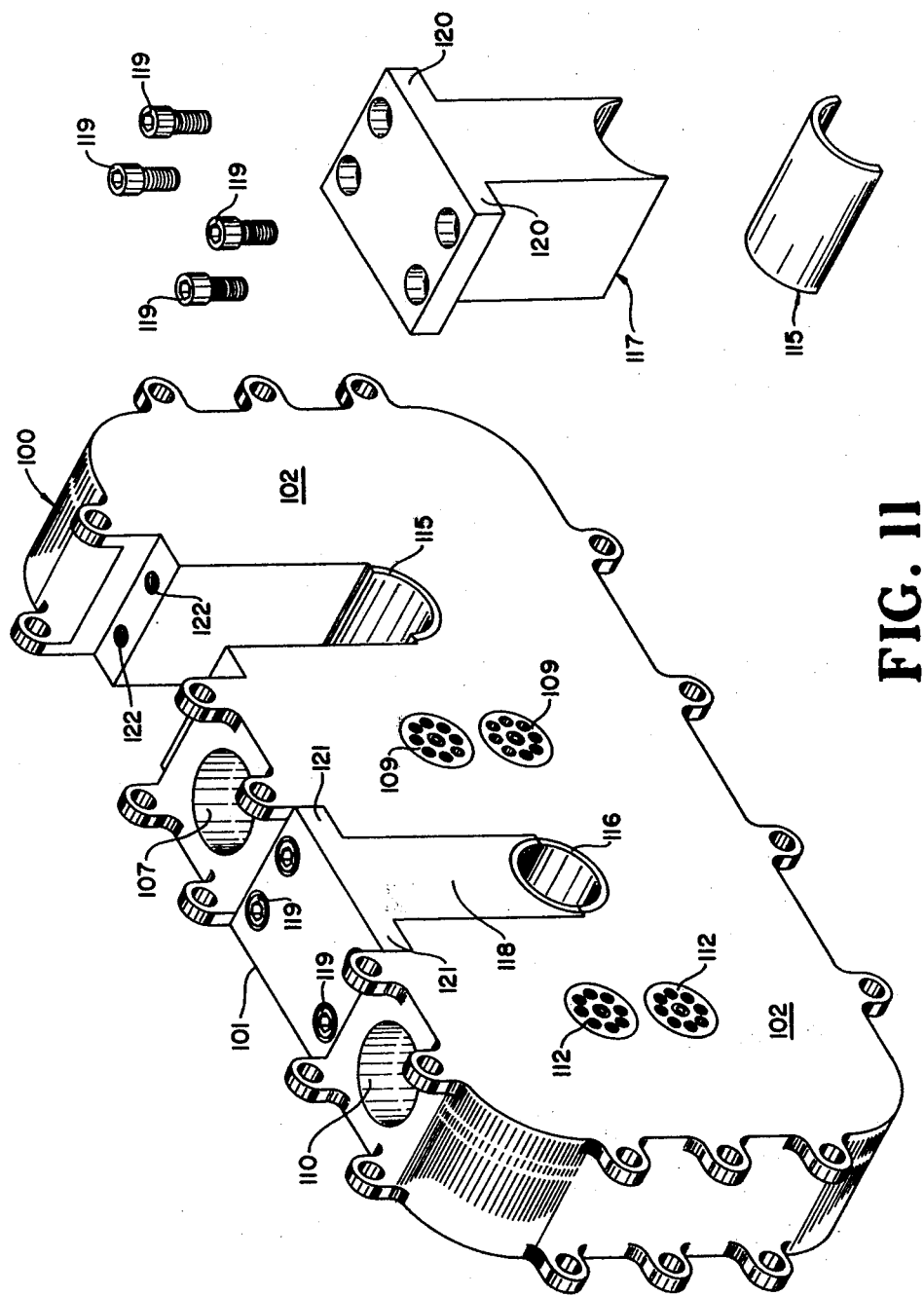
FIG. 11 is a perspective view of the central stationary wall of the four compression chambers compressor with one shaft bearing and its support exploded.

Two bearings 115 and 116 are located in central wall 100. Bearings 115 and 116 journal rotatably shafts 160 and 180 between their eccentric portions and are split in two halves each. Bearings 115 and 116 are assembled in axially spaced central wall 100 with holders 117 and 118, respectively. Bottom halves of bearings 115 and 116 are mounted directly in wall 100. Top halves of bearings 115 and 116 can be held by holders 117 and 118, which can be secured to wall 100 by means of screws 119 located in flange portions 120 of holder 117, in flange portions 121 of holder 118 and in corresponding openings 122 in wall 100. Such design allows for easy assembly of central wall 100 and shafts 160 and 180. This is best seen in FIG. 11.

Central wall 100 may have a plurality of cooling chambers or passageways 124, connected to the same suitable cooling means as cooling chambers or passageways 90 and 140 of walls 75 and 125. If air is used as a cooling medium, cooling passageways 124 may have cooling ribs on their internal surfaces.

Figure 10:
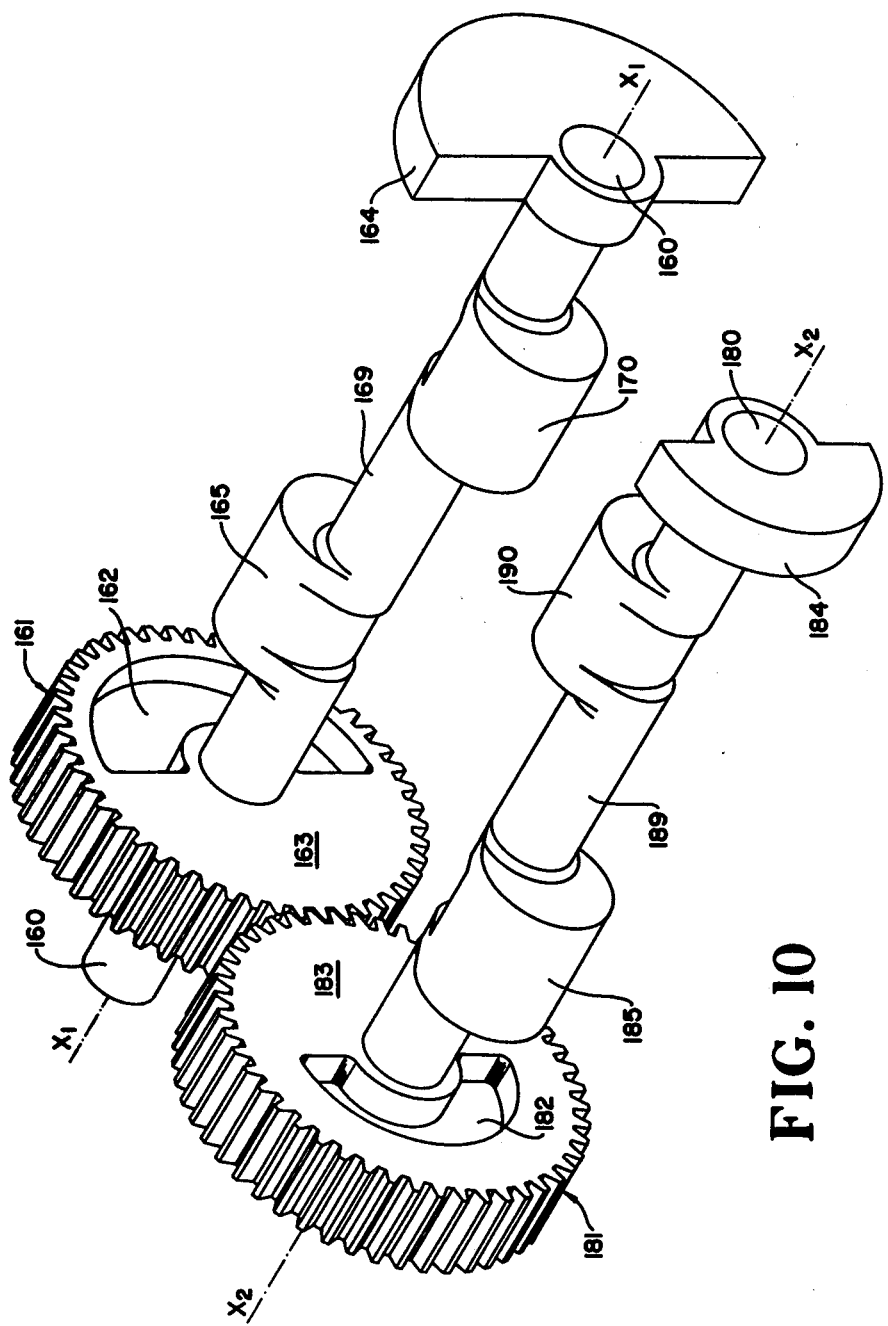
FIG. 10 is a perspective view of the two shafts of the four compression chambers compressor version, with gears and balancing elements assembled.

FIG. 10 shows, in a perspective view, shafts 160 and 180 of the four compression chambers compressor. Shaft 160 has two eccentric portions 165 and 170, and shaft 180 has two eccentric portions 185 and 190. Eccentric portions 165 and 170 of shaft 160 are positioned angularly from each other, and eccentric portions 185 and 190 of shaft 180 are positioned angularly from each other. Positioning of 180° between eccentric portions 165 and 170 and between eccentric portions 185 and 190 is preferred. Otherwise, the gearing and balancing system of shafts 160 and 180, as shown in FIG. 10, are similar to gearing and balancing systems of shafts 160 and 180 of two compression chambers compressor, and the description of FIG. 4 applies also to FIG. 10.

Cylinder-piston elements 250 and 350 and piston elements 300 and 400 of the four compression chambers compressor are identical with the cylinder-piston and piston of the two compression chambers compressor.

Cylinder-piston 250 and piston 300 are journaled on eccentric portions 165 and 185 of shafts 160 and 180, and cylinder-piston 350 and piston 400 are journaled on eccentric portions 170 and 190 of shafts 160 and 180. Planetary rotations of piston 300 and 400 with respect to coordinated and opposite planetary rotations of cylinder-pistons 250 and 350, respectively, change volumes of variable volume compression chambers 450, 451, 452 and 453.

THE OPERATION OF THE INVENTION

The operation of the rotary compressor of this invention will be described now in connection with two compression chambers compressor, as illustrated in views of FIGS. 1 through 6 and 12 through 15.

As the rotary, two compression chambers compressor of the invention disclosed herein operates, cylinder-piston 250 and piston 300 elements follow coordinated planetary movements in opposite directions, resulting in changing volumes of compression chambers 450 and 451. Intake valves 79 and 81, and discharge valves 129 and 131 are opened and closed sequentially and in required intervals to allow for intake of fresh and discharge of compressed fluid circulated through the compressor. Four representative positions of cylinder-piston 250 and piston 300 will now be described with reference to FIGS. 12 through 15.

Figure 12:
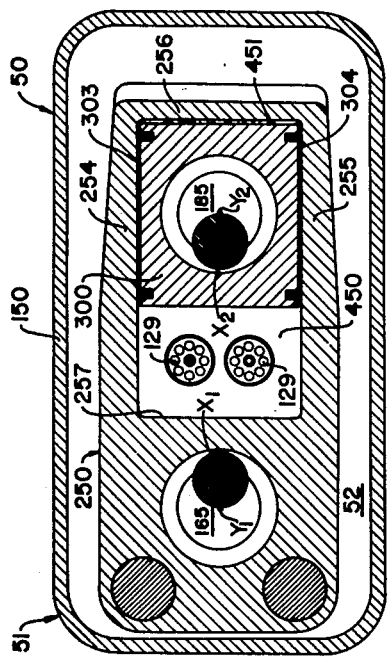
FIGS. 12 through 15 are transverse sectional views taken along the line 12—12 of FIGS. 1 and 7 and showing the first and second variable volume compression chambers undergoing full cycles of the intake and compression.

FIG. 12 shows eccentric portion 165 of shaft 160 with axis $Y_1$—$Y_1$ and body 253 of cylinder-piston 250 and eccentric portion 185 of shaft 180 with axis $Y_2$—$Y_2$ and piston 300 positioned interiorly in cavity 52 of the compressor and laterally to the position of axes $X_1$—$X_1$ and $X_2$—$X_2$ of shafts 160 and 180. Compression chamber 450 is at about its minimum volume, and compression chamber 451 is at about its maximum volume. This may represent the end of the compression stroke in chamber 450 and the end of the intake stroke in compression chamber 451.

As illustrated in FIGS. 12 through 15 of the drawings, shaft 160 with its eccentric portion 165 and cylinder-piston 250 journaled thereon rotates counterclockwise, and shaft 180 with its eccentric portion 185 and piston 300 journaled thereon rotates clockwise.

Figure 13:
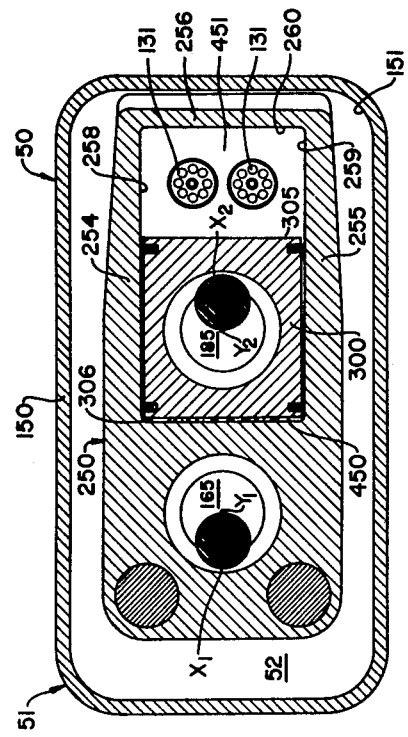

FIG. 13 shows shaft 160 with cylinder-piston 250 and shaft 180 with piston 300 rotated 90° from the positions shown in FIG. 12. Compression chambers 450 and 451 are at about their half volumes. Intake valve or valves 73 leading into compression chamber 450 are open, and the intake stroke is in progress. In compression chamber 451, the compression stroke is in progress.

Figure 14:
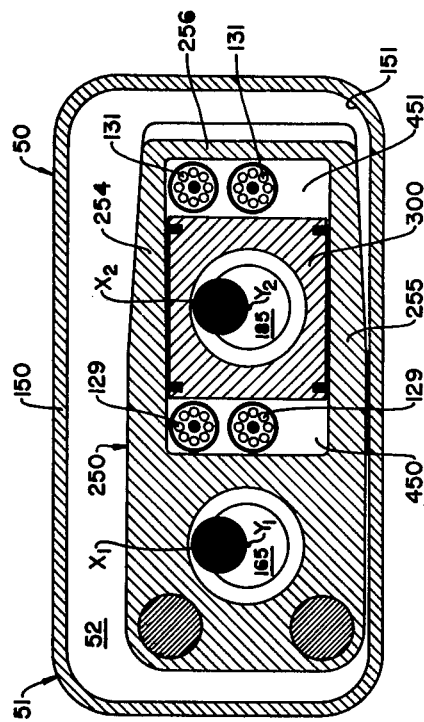

FIG. 14 shows shaft 160 with cylinder-piston 250 and shaft 180 with piston 300 rotated 180° from the position shown in FIG. 12. Compression chamber 450 is at about its maximum volume, which may represent the end of the intake stroke and the beginning of the compression stroke. Compression chamber 451 is at about its minimum volume, which may represent the end of the compression stroke and beginning of the intake stroke.

Figure 15:
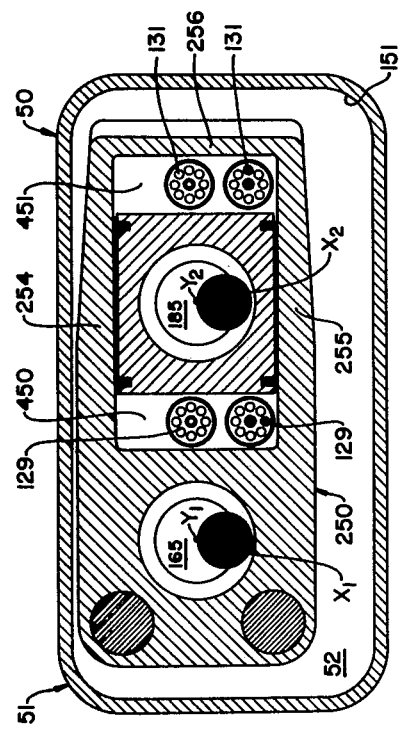

FIG. 15 shows both shafts with their elements rotated 270° from the positions shown in FIG. 12. The compression stroke is in progress in compression chamber 450, and the intake is in progress in compression chamber 451 with intake valve or valves 81 open.

One full cycle of the operation will be completed after the shafts with their piston and cylinder-piston elements will be rotated 90° from positions shown in FIG. 15 and after they will again reach positions shown in FIG. 12. This will complete the compression stroke in compression chamber 450 and the intake stroke in compression chamber 451.

All intake and discharge valves are opened and closed in required manner during the operation of the compressor. Intake valves 79 and 81 open when compression chamber 450 is at about its minimum volume and close when compression chamber 450 is at about its maximum volume. Discharge valves 129 and 131 are closed during the intake stroke and until pressure in compression chamber 450 reaches desired level during the compression stroke. When the pressure of fluid circulated through the compressor of this invention reaches desired level, discharge valves 129 and 131 open and are open until the compression stroke ends when compression chamber 450 is at about its minimum volume. New intake stroke follows after completion of the discharge stroke.

The intake and discharge strokes in compression chamber 451 are spaced 180° from the intake and discharge strokes of compression chamber 450. Likewise, intake valve or valves 79 and discharge valve or valves 129 of compression chamber 450 open and close at intervals spaced 180° from those of intake valve or valves 81 and discharge valve or valves 131 of compression chamber 451.

The operation of compression chambers 450 and 451 in the four compression chambers compressor is identical to the operation of compression chambers 450 and 451 in the two compression chambers version of the compressor. However, the operation of compression chamber 452 is phased from the operation of compression chamber 450, and similarly, the operation of chamber 453 is phased from the operation of compression chamber 451. Phasing between the operation of compression chambers 452 and 450 and between the operation of compression chambers 453 and 451 corresponds to positioning between eccentric portions 165 and 170 of shaft 160 and eccentric portions 185 and 190 of shaft 180, which is preferably 180°. All intake and discharge valves of compression chambers 450, 451, 452, and 453 open and close at intervals as required for completion of the intake, compression and discharge in all compression chambers.

It is understood that the intake channels of any version of the rotary compressors disclosed may be connected to an appropriate compressible fluid, which may be air or a variety of gases and vapors. Also, the discharge channels may be connected to an appropriate receiver of compressed compressible fluid.

The rotary compressor of this invention may be constructed of known suitable materials dependent upon the particular use desired, and may be powered by any suitable prime mover.

The refrigerating version of the compressor of the type disclosed, may be enclosed with a suitable prime mover (preferably an electric motor) in a gas-tight shell, or housing, to form a so-called hermetically or semi-hermetically sealed compressor. The advantage of such design is elimination of shaft seals and improved protection of internal parts of the compressor, providing more reliable service and longer, trouble-free operation.

THE PROCESS OF COMPRESSING

A compressible fluid compressing process of my invention of a two compression chambers rotary compressor comprises sequentially:

opening an intake valve or valves leading into a first compression chamber located between a piston, a body and spaced walls of a cylinder-piston, and axially spaced stationary walls when the first compression chamber is at about its minimum volume;

closing an intake valve or valves leading to a second compression chamber located between the piston, the two spaced walls and interconnecting them wall of the cylinder-piston, and the axially spaced stationary walls when the second compression chamber is at about its maximum volume;

passing the compressible fluid to be compressed through the intake valve or valves into the first compression chamber while:

the volume of the first compression chamber increases as a result of coordinated and opposite planetary rotations of the piston and the cylinder-piston with a distance between the piston and the body of the cylinder-piston increasing; and a discharge valve or valves of the first compression chamber are closed;

compressing the compressible fluid in the second compression chamber by decreasing the volume of the second compression chamber as a result of the coordinated and opposite planetary rotations of the piston and the cylinder-piston while the distance between the piston and the wall interconnecting the two spaced walls of the cylinder-piston decreases;

opening a discharge valve or valves of the second compression chamber when the pressure of the compressible fluid compressed in the second compression chamber reaches desired level, while continuing the intake process of the first compression chamber;

passing the compressed compressible fluid from the second compression chamber through the discharge valve or valves and into a suitable receiver while the decreasing of the volume of the second compression chamber continues, and while continuing the intake process of the first compression chamber;

closing the intake valve or valves of the first compression chamber when the first compression chamber is at about its maximum volume;

opening the intake valve or valves leading into the second compression chamber when the second compression chamber is at about its minimum volume;

compressing the compressible fluid in the first compression chamber by decreasing the volume of the first compression chamber as a result of the coordinated and opposite planetary rotations of the piston and the cylinder-piston while the distance between the piston and the body of the cylinder-piston decreases;

passing the compressible fluid to be compressed through the intake valve or valves into a second compression chamber while:

the volume of the second compression chamber increases as a result of the coordinated and opposite planetary rotations of the piston and the cylinder-piston with the distance between the piston and the wall interconnecting the two spaced walls of the cylinder-piston increasing; and the discharge valve or valves of the second compression chamber are closed;

opening the discharge valve or valves of the first compression chamber when the pressure of the compressible fluid compressed in the first compression chamber reaches desired level, and while the intake process in the second compression chamber continues;

passing the fluid from the first compression chamber through the discharge valve or valves and into a suitable receiver while the compression process in the first compression chamber continues, and while the intake process in the second compression chamber continues;

closing the discharge valve or valves of the first compression chamber when the first compression chamber is at about its minimum volume; and repeating the cycle in the first and in the second variable volume compression chambers.

The process of compressing the compressible fluid as set forth for the two variable compression chambers rotary compressor is also applicable for the compressors having the four, six or more variable volume compression chambers, and all skilled in the art will readily apply the process disclosed herein to such multi-compression chambers compressors.

While the foregoing specification has been limited to the rotary compressors of the type described, it will be apparent to those skilled in the art that the disclosed herein positive displacement rotary mechanism may be applied to other types of rotary machines, for example, a variety of prime movers such as internal combusion engines, external combustion engines, steam expanders, to air and hydraulic engines, vacuum and hydraulic pumps, air and gas expanders, and to numerous other rotary machines.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A compressible fluid compressing process comprising sequentially the steps of:

opening an intake valve or valves leading into a first compression chamber located between a piston, a body and spaced walls of a cylinder-piston, and axially spaced stationary walls when said first compression chamber is at about its minimum volume;

closing an intake valve or valves leading to a second compression chamber located between said piston, said two spaced walls and an interconnecting wall of said cylinder-piston, and said axially spaced stationary walls when said second compression chamber is at about its maximum volume;

passing said compressible fluid to be compressed through said intake valve or valves into said first compression chamber while:

said volume of said first compression chamber increases as a result of a coordinated and opposite planetary rotations of said piston and said cylinder-piston with a distance between said piston and said body of said cylinder-piston increasing; and a discharge valve or valves of said first compression chamber are closed;

compressing said compressible fluid in said second compression chamber by decreasing said volume of said second compression chamber as a result of said coordinated and opposite planetary rotations of said piston and said cylinder-piston while a distance between said piston and said wall interconnecting said two spaced walls of said cylinder-piston decreases;

opening a discharge valve or valves of said second compression chamber when the pressure of said compressible fluid compressed in said second compression chamber reaches desired level, while continuing said intake process in said first compression chamber;

passing said compressed compressible fluid from said second compression chamber through said discharge valve or valves and into a suitable receiver while said compression process in said second compression chamber continues, and while continuing said intake process in said first compression chamber;

closing said intake valve or valves of said first compression chamber when said first compression chamber is at about its maximum volume;

closing said discharge valve or valves of said second compression chamber when said second compression chamber is at about its minimum volume;

opening said intake valve or valves leading into said second compression chamber when said second compression chamber is at about its minimum volume;

compressing said compressible fluid in said first compression chamber by decreasing said volume of said first compression chamber as a result of said coordinated and opposite planetary rotations of said piston and said cylinder-piston while said distance between said piston and said body of said cylinder-piston decreases;

passing said compressible fluid to be compressed through said intake valve or valves into said second compression chamber while:

said volume of said second compression chamber increases as a result of said coordinated and opposite planetary rotations of said piston and said cylinder-piston with said distance between said piston and said wall interconnecting said two spaced walls of said cylinder-piston increasing; and said discharge valve or valves of said second compression chamber are closed;

opening said discharge valve or valves of said first compression chamber when the pressure of said compressible fluid compressed in said first compression chamber reaches desired level, and while said intake process in said second compression chamber continues;

passing said compressed compressible fluid from said first compression chamber through said discharge valve or valves and into a suitable receiver while said compression process in said first compression chamber continues, and while said intake process in said second compression chamber continues;

closing said discharge valve or valves of said first compression chamber when said first compression chamber is at about its minimum volume; and repeating said cylcle in said first and in said second variable volume compression chambers.

2. A rotary compressor comprising:

a cylinder-piston comprising a body, two spaced walls extending from one end of said body and having opposing parallel surfaces, and a wall interconnecting said two spaced walls at their ends remote from said body to form an opening in said cylinder-piston;

said cylinder-piston further having two side faces;

a piston positioned within said opening of said cylinder-piston and having spaced faces adjoining said opposing parallel surfaces of said spaced walls of said cylinder-piston;

said piston further having two spaced side faces;

two axially spaced walls adjoining said side faces of said cylinder-piston and said spaced side faces of said piston;

a rotatable cylinder-piston shaft comprising an eccentric portion journaled in said body of said cylinder-piston;

a rotatable piston shaft comprising an eccentric portion journaled in said piston;

gearing means interconnecting said cylinder-piston shaft and said piston shaft so said shafts follow coordinated rotations in opposite directions and said cylinder-piston and said piston follow coordinated planetary rotations in opposite directions with and around said eccentric portions of said shafts;

said cylinder-piston and said piston forming moveable surfaces, and said axially spaced walls forming stationary surfaces of two compression chambers located between said body of said cylinder-piston and said piston and between said piston and said wall interconnecting said two spaced walls of said cylinder-piston and varying in volumes upon said coordinated planetary rotations in opposite directions of said cylinder-piston and said piston;

intake means comprising intake valve leading to each of said compression chambers; and discharge means leading from said compression chambers.

3. The compressor of claim 2 wherein said cylinder-piston shaft and said piston shaft are journaled in bearings located in said axially spaced walls.

4. The compressor of claim 2 wherein said gearing means comprise gears interconnecting said cylinder-piston and said piston shafts and having equal number of teeth so said shafts rotate with equal rotational speeds in opposite directions.

5. The compressor of claim 2 which further comprises a balancing means, wherein said balancing means comprise cylinder-piston balancing means comprising a cylinder-piston balancing portion located in a part of said body of said cylinder-piston remote from said spaced walls and from said wall interconnecting said spaced walls, said balancing portion making the center of gravity of said cylinder-piston located on or close to the axis of said bearing located in said body of said cylinder-piston; and wherein said balancing means comprise piston balancing means, said piston balancing means being such design of said portion so said piston has its center of gravity located on or close to the axis of said bearing located in said piston; and wherein said balancing means further comprise cylinder-piston shaft and piston shaft balancing means, said last mentioned means comprising balancing elements secured to said shafts and dynamically balancing said shafts with all elements assembled and journaled on said shafts.

6. The compressor of claim 2 wherein said discharge means leading from said compression chambers comprise at least one discharge valve per each compression chamber located in at least one of said axially spaced walls.

7. The compressor of claim 2 which further comprises lubricating means, said lubricating means comprising a lubricant reservoir containing suitable lubricant lubricating coacting surfaces of said cylinder-piston, said piston, said axially spaced walls, further lubricating said gears interconnecting said cylinder-piston shaft and said piston shaft, and said bearings of said cylinder-piston shaft and said piston shaft.

8. The compressor of claim 2 which further comprises a cooling means, said cooling means comprising a plurality of passageways located in said spaced housing walls in which suitable coolant is circulated.

9. The compressor of claim 2 wherein said eccentric portion of said cylinder-piston shaft is journaled in a bearing located in said body of said cylinder-piston, and wherein said eccentric portion of said piston shaft is journaled in a bearing located in said piston.

10. The compressor of claim 9 wherein said cylinder-piston shaft and said piston shaft are crankshafts and wherein said eccentric portions of said cylinder-piston shaft and said piston shaft are cranks.

11. The compressor of claim 9 wherein said cylinder-piston shaft and said piston shaft are eccentric shafts and wherein said eccentric portions of said cylinder-piston shaft and said piston shaft are eccentrics.

12. The compressor of claim 2 wherein said cylinder-piston, said piston and said axially spaced walls are sealingly engaged in forming said compression chambers.

13. The compressor of claim 12 wherein said sealing engagement between said cylinder-piston, said piston and said axially spaced walls results from use of sealing means comprising sealing elements located with springs in grooves in said cylinder-piston and in said piston and wherein said sealing elements located in said grooves of said cylinder-piston and said piston are sealingly engaged with co-working surfaces of said cylinder piston and said axially spaced walls in forming a sealing path around said compression chamber.

14. The compressor of claim 12 wherein said sealing engagement between said cylinder-piston, said piston and said axially spaced walls results from a combination of suitable running clearances between said cylinder-piston and said piston and between said cylinder-piston, said piston and said axially spaced walls, suitable finish of coating surfaces of said cylinder-piston, coacting surfaces of said piston and coacting surfaces of said axially spaced walls, and use of lubricant of suitable viscosity to lubricate said coacting surfaces of said cylinder-piston, said piston and said axially spaced walls.

15. The compressor of claim 2 wherein said intake means leading to said compression chambers comprise at least one intake valve leading to each of said compression chambers, and located in at least one of said axially spaced walls, said intake valves being sequentially opened and closed to allow for required flow of incoming charge into said compression chambers.

16. The compressor of claim 15 wherein said intake valves are opened when said compression chambers are at about their minimum volumes, and wherein said intake valves are closed when said compression chambers are at about their maximum volumes.

17. A rotary compressor comprising:
at least two cylinder-pistons each comprising a body, two spaced walls extending from one end of said body and having opposing parallel surfaces, and a wall interconnecting said two spaced walls at their ends remote from said body to form openings in said cylinder-pistons;

each of said cylinder-pistons further having two side faces;

at least two pistons positioned within said openings of said cylinder-pistons and having spaced faces adjoining said opposing parallel surfaces of said spaced walls of said cylinder-pistons;

each of said pistons further having two spaced side faces;

at least three axially spaced walls adjoining said side faces of said cylinder-pistons and said spaced side faces of said pistons;

a rotatable cylinder-piston shaft comprising eccentric portions journaled in said bodies of said cylinder-pistons;

a rotatable piston shaft comprising eccentric portions journaled in said pistons;

gearing means interconnecting said cylinder-pistons shaft and said pistons shaft so said shafts follow coordinated rotations in opposite directions and said cylinder-pistons and said pistons follow coordinated planetary rotations in opposite directions with and around said eccentric portions of said shafts;

said cylinder-pistons and said pistons forming moveable surfaces, and said axially spaced walls forming stationary surfaces of at least four compression chambers located between said bodies of said cylinder-pistons and said pistons and between said pistons and said walls interconnecting said two spaced walls of each of said cylinder-pistons and varying in volumes upon said coordinated planetary rotations in opposite directions of said cylinder-pistons and said pistons;

intake means comprising an intake valve leading to each of said compression chambers; and discharge means leading from said compression chambers.

18. The compressor of claim 17 wherein said cylinder-piston shaft and said piston shaft are journaled in bearings located in said axially spaced walls.

19. The compressor of claim 17 wherein said gearing means comprise gears interconnecting said cylinder-pistons and said pistons shafts and having equal number of teeth so said shafts rotate with equal rotational speeds in opposite directions.

20. The compressor of claim 17 which further comprises a balancing means, wherein said balancing means comprise cylinder-pistons balancing means comprising cylinder-pistons balancing portions located in parts of said bodies of said cylinder-pistons remote from said spaced walls and from said walls interconnecting said spaced walls, said balancing portions making the centers of gravity of said cylinder-pistons located on or close to the axes of said bearings located in said bodies of said cylinder-pistons; and wherein said balancing means comprise pistons balancing means, said pistons balancing means being such designs of said pistons so said pistons have their centers of gravity located on or close to the axes of said bearings located in said pistons; and wherein said balancing means further comprise cylinder-pistons shaft and pistons shaft balancing means, said last mentioned means comprising balancing elements secured to said shafts and dynamically balancing said shafts with all elements assembled and journaled on said shafts.

21. The compressor of claim 17 wherein said discharge means leading from said compression chambers comprise at least one discharge valve per compression chamber, said discharge valves located in said axially spaced walls.

22. The compressor of claim 17 which further comprises lubricating means, said lubricating means comprising a lubricant reservoir containing suitable lubricant lubricating coacting surfaces of said cylinder-pistons, said pistons, said axially spaced walls, further lubricating said gears interconnecting said cylinder-pistons shaft and said pistons shaft, and said bearings of said cylinder-pistons shaft and said pistons shaft.

23. The compressor of claim 17 which further comprises a cooling means, said cooling means comprising a plurality of passageways located in said spaced housing walls in which suitable coolant is circulated.

24. The compressor of claim 17 wherein said eccentric portions of said cylinder-piston shaft are journaled in bearings located in said bodies of said cylinder-pistons, and wherein said eccentric portions of said piston shaft are journaled in bearings located in said pistons.

25. The compressor of claim 24 wherein said cylinder-pistons shaft and said pistons shaft are crankshafts and wherein said eccentric portions of said cylinder-pistons shaft and said pistons shaft are cranks.

26. The compressor of claim 24 wherein said cylinder-pistons shaft and said pistons shaft are eccentric shafts and wherein said eccentric portions of said cylinder-pistons shaft and said pistons shaft are eccentrics.

27. The compressor of claim 17 wherein said cylinder-pistons, said pistons and said axially spaced walls are sealingly engaged in forming said compression chambers.

28. The compressor of claim 27 wherein said sealing engagement between said cylinder-pistons, said pistons and said axially spaced walls results from use of sealing means comprising sealing elements located with springs in grooves in said cylinder-pistons and in said pistons and wherein said sealing elements located in said grooves of said cylinder-pistons and said pistons are sealingly engaged with co-working surfaces of said cylinder pistons and said axially spaced walls in forming a sealing path around said compression chambers.

29. The compressor of claim 27 wherein said sealing engagement between said cylinder-pistons, said pistons and said axially spaced walls results from a combination of suitable running clearances between said cylinder-pistons and said pistons and between said cylinder-pistons, said pistons and said axially spaced walls, suitable finish of coacting surfaces of said cylinder-pistons, coacting surfaces of said pistons and coacting surfaces of said axially spaced walls, and use of lubricant of suitable viscosity to lubricate said coacting surfaces of said cylinder-pistons, said pistons and said axially spaced walls.

30. The compressor of claim 17 wherein said intake means leading to said compression chambers comprise at least one intake valve leading to each of said compression chambers, and located in at least one of said axially spaced walls, said intake valves being sequentially opened and closed to allow for required flow of incoming charge into said compression chambers.

31. The compressor of claim 30 wherein said intake valves are opened when said compression chambers are at about their minimum volumes, and wherein said intake valves are closed when said compression chambers are at about their maximum volumes.

* * * * *